9688X
2 Sheets—Sheet 1.
J. D. BUZZELL.
Stone Dressing Machine.
Patented June 2, 1836.
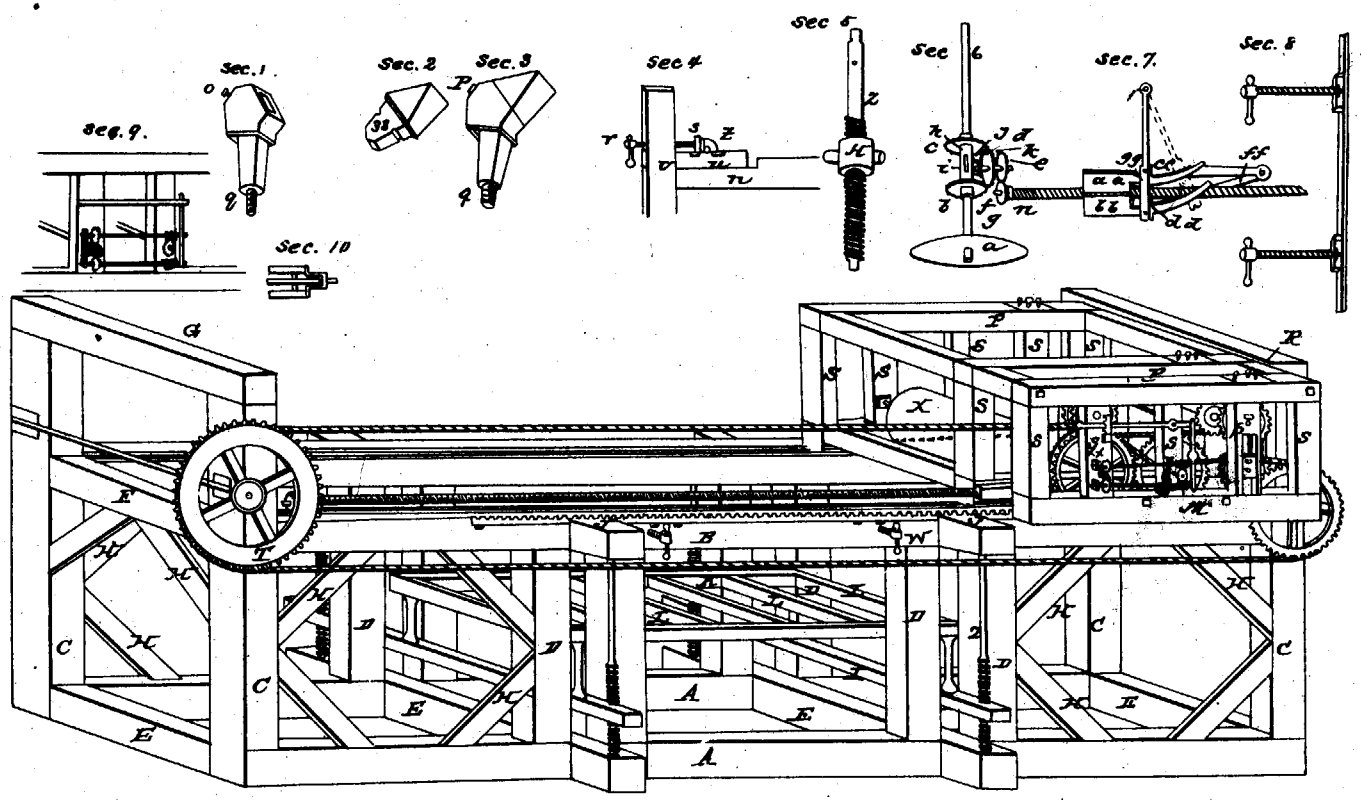
N. PETERS, Photo-Lithographer, Washington, D. C.

9688 X
2 Sheets. Sheet 2.
J. D. Buzzell.
Dressing Stone.
Patented June 2, 1836.
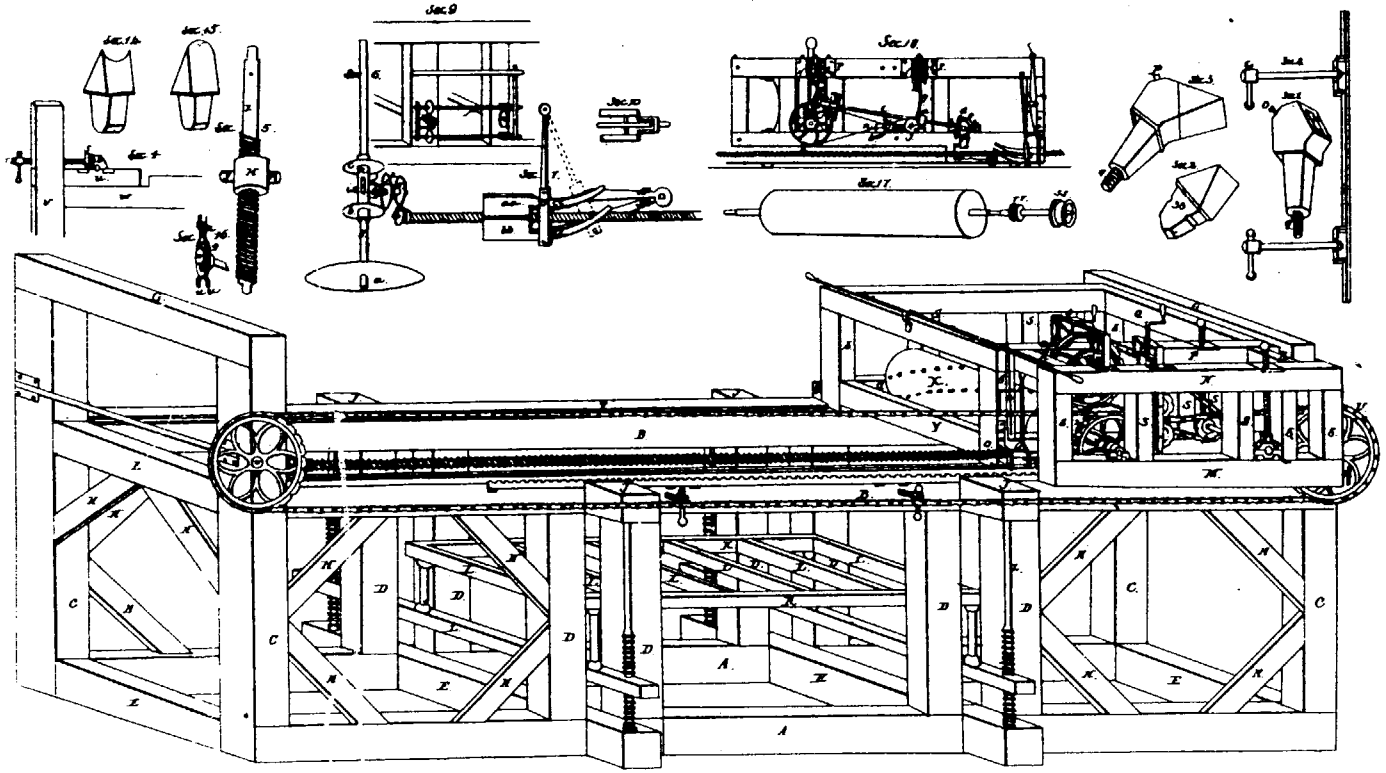

9688X June 2, 1836

John D. Buzzell

Letters Patent.

(Patented June 2, 1836.)

The Schedule referred to in these Letters Patent, and
making part of the same, containing a description in the words
of the said John D. Buzzell himself of his Improvement in the
machine for Cutting or Dressing Granite, Marble or other Stone.

This machine consists of an oblong square frame standing upon
upright posts. Inside of the side rails or beams of the frame are
grooves in which the carriage containing the Machinery moves forward
and backward on friction Wheels. In the moveable carriage is one or
more metalic cylinders or drums around which are set spirally one
or more rows of Metalic chisels, or sockets in which the chisels are
confined, or are to be connected; the chisels are to be of various sizes &
forms for the purpose of dressing, Moulding, grooving and polishing granite,
marble ~~and~~ stone of all descriptions. The cylinder or cylinders revolve ver-
tically by means of a chain band passing around two wheels one of which
is at each extremity of one of the side rails or beams above mentioned. Between
said extremities and wheels, is a wheel connected to each Cylinder or Cy-
linders (when more than one is used) and over which last named wheel or
wheels said band passes, communicating the Motion and power of the first
named wheel to the latter and by which motion the wheel or wheels connect-
ed to the axle or axles of the Cylinder or Cylinders by means of a square box
in one end of the former, and a square tenon on one end of the latter.
The Cylinder or Cylinders are made to revolve.

The Chain is bound down upon the intermediate wheels above described
by means of friction rollers bearing upon the band. The wheels around and
over which the chain band passes have cogs which mesh into the links of
the chain. The axle of one of the wheels at the end of the carriage passes
through two metalic blocks. These blocks each work through two openings
connected to the carriage, so that the blocks can be moved backward and
forward 9688x June 2, 1836 forward by two screws passing through a metalic nut confined to the
frame of the Machine—at the end of each screw is a round tenant which
is inserted and so fastened into the end of each block (through which
the axle of the wheel passes) as to revolve in such a manner that when
the screws are turned the blocks move horizontally backward or
forward through the boxes; whereby the chain band may be tightened
or relaxed at pleasure. The motion of the moveable carriage forward
is accurately guaged and regulated either by a combination of wheels
mashing into each other operated upon by a small wheel on the axle
of the cylinder wheel, and by one of those wheels thus combined on
mashing into and acting upon the cog rail confined to the side of the
side beam or rail of the frame; the last named wheel can be
geared or ungeared at pleasure by means of a lever operating upon the
box supporting one end of said wheel. The carriage is brought by
a wheel mashing into a wheel on the axle of the cylinder wheel
and at the same time mashing into the cog wheel, and at the same time
mashing into the cog rail before mentioned, which wheel can be
geared or ungeared at pleasure by means of a lever;—or the car=
riage is to be moved forward by means of a screw situated a
near and inside of the cog rail running parallel with the cog rail
upon the beam or side rail of the carriage—the screw is connected at
each end to the beam or side rail of the Machine, and is put into
motion, and caused to revolve by means of a wheel on one end
of the screw which wheel mashes into a wheel on the axle of the cog
wheel which carries the band situated at one end of the frame so
that by the revolution of the screw, the screw operating upon a [illegible]
block which is connected by boxes or slides to one end of the moveable
carriage and the other end of the block resting upon the screw. The
end of the block which rests upon the screw is of a semicircular form
and is so grooved and formed as to mash into the threads of the screw
and thus by the revolution of the screw the carriage is moved forward.
The above named block can be geared or ungeared by means of a
lever. The carriage in this case is moved backward in the same
manner 9688x                                                                June 2, 1836 manner, as is moved backward, when moved forwards by a
combination of wheels. Between the rails of the frame is a bed
or platform to hold the stone or any other article to be operated upon,
over which the moveable carriage is to pass- this platform is
made of timber with cross bars forming grate work overlaid with
metalic plate and is supported by upright posts with round heads
at each end- the upper ends connected by sockets to the timbers of the
platform, and the lower ends resting in sockets confined to the tran
sverse bars situated below the platform and extending outside
the frame of the carriage. The platform is moved upwards and down
wards by means of screws working through nuts connected to or near
the ends of the transverse bars, which nuts move on their centre
for the purpose of varying the position of the platform as circumstances
may require. The screws stand perpendicular- the lower ends
resting in Metalic sockets passing through the nuts described above
and the upper ends are supported by boxes inserted in or connected
to posts, which posts are connected to the beams of the frame are & project
outside of the Machine, the screws are turned by levers by which
the platform is raised or lowered as occasion demands.

What I claim as new and for which I ask Letters Patent
is the particular arrangement and combination of the cutting and
polishing Cylinders and Rubbers, the method of raising and
regulating the stone, and the arrangement of Machinery for mo
ving the carriage and revolving the Cylinder or Cylinders.

Witnesses
W. Buck                                        John C. Bussell
Moses Mason Jr.

1105 Words]
(Rec'd & Recorded anew July 22. 1837)

Drawing